(12) United States Patent
Ariyoshi

(10) Patent No.: US 6,388,835 B1
(45) Date of Patent: May 14, 2002

(54) DISK DRIVE COMPRISING A HOLDER UNIT AND CHASSIS UNIT

(75) Inventor: Yuji Ariyoshi, Toyonaka (JP)

(73) Assignee: Matsushita Electric Industrial Co., Ltd., Osaka-fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,239

(22) Filed: Sep. 25, 1998

(30) Foreign Application Priority Data

Sep. 29, 1997 (JP) .............................. 9-264051

(51) Int. Cl.⁷ .......................... G11B 17/02; G11B 33/02
(52) U.S. Cl. .................................. 360/99.12; 369/77.2
(58) Field of Search ...................... 360/99.12; 369/75.2, 369/77.2

(56) References Cited

U.S. PATENT DOCUMENTS

| | | | | |
|---|---|---|---|---|
| 5,153,792 A | * | 10/1992 | Kawano | 360/99.01 |
| 5,450,377 A | * | 9/1995 | Eom | 369/13 |
| 5,504,730 A | * | 4/1996 | Kanada | 369/75.1 |
| 5,537,377 A | | 7/1996 | Takai et al. | 369/77.2 |
| 5,572,497 A | * | 11/1996 | Kim et al. | 369/77.2 |
| 5,600,508 A | * | 2/1997 | Choi | 360/96.5 |
| 5,699,210 A | * | 12/1997 | Thompson et al. | 360/99.06 |

FOREIGN PATENT DOCUMENTS

| | | |
|---|---|---|
| DE | 36 03 906 | 8/1986 |
| EP | 0 518 259 A2 | 12/1992 |
| JP | 6-267124 | 9/1994 |
| JP | 8-102118 | 4/1996 |
| JP | 8-171765 | 7/1996 |
| JP | 8-180625 | 7/1996 |
| WO | 97/18563 | 5/1997 |

* cited by examiner

*Primary Examiner*—David Davis
(74) *Attorney, Agent, or Firm*—Wenderoth, Lind & Ponack, L.L.P.

(57) ABSTRACT

The object is to improve the productivity and serviceability in the assembling work by exalting the assembling performance of a disk drive and for further decreasing the size of the disk drive. The disk drive is provided with a recording and reproducing unit for recording or reproducing information on a minidisk encased in a disk cartridge, a holder and holding the disk cartridge that is being inserted, a slider capable of transfering the disk cartridge between a mounting and dismounting position and an insertion completed position, drive mechanisms capable of driving the slider, and a chassis that serves as a mounting base for these principal components of the disk drive. The disk drive is constructed of two units of a holder unit obtained by mounting the slider on the holder, and a chassis unit obtained by mounting the recording and reproducing unit and the drive mechanism on the chassis. The holder unit is vertically pivotal to the chassis, wherein the transfer member and the drive mechanism are engaged with each other in the vertical direction.

12 Claims, 14 Drawing Sheets

DISK DRIVE COMPRISING A HOLDER UNIT AND CHASSIS UNIT

BACKGROUND OF THE INVENTION

The present invention relates to disk drives, and more particularly, to a disk drive which is applied to a disk of, for example, the so-called MD (minidisk) or the like including a recording and/or reproducing medium encased in a disk cartridge and is provided for recording information on the medium or reproducing the information recorded on the medium.

As a disk drive to be applied to a disk of, for example, the so-called MD (minidisk) or the like including a recording and/or reproducing medium encased in a disk cartridge, there has conventionally been generally known a disk drive provided with a recording and reproducing unit for recording information on the recording and/or reproducing medium encased in a disk cartridge or reproducing the information recorded on the medium, a holder for guiding and holding the disk cartridge that is being inserted, a loading mechanism capable of transferring the disk cartridge between a mounting and dismounting position where the disk cartridge can be mounted on and dismounted from the holder and a recording and reproducing position of the recording and reproducing unit, a drive mechanism capable of driving the loading mechanism and a chassis that serves as a mounting base for these principal components of the disk drive. For example, the prior art references of Japanese Patent Laid-Open Publication No. HEI 6-267124, Japanese Patent Laid-Open Publication No. HEI 8-102118, Japanese Patent Laid-Open Publication No. HEI 8-171765 and Japanese Patent Laid-Open Publication No. HEI 8-180625 and so on disclose the detailed constructions of such a disk drive.

In the above disk drive, the principal components of the recording and reproducing unit, holder, loading mechanism and drive mechanism are finally fixed and supported by, or engaged with, the chassis directly, or indirectly, to be assembled into a finished product.

However, most of the above principal components themselves are constructed of many elements, and in order to assure accurate and smooth operation, a very high accuracy is required for the above principal components and their assembled state in such a disk drive. Therefore, a lot of processes are required for assembling them as a finished product, and this has led to the drawback that much labor and time are necessary for the assembling work.

The disk drive of the above type is constructed by assembling many elements as described above. Therefore, the structure is inevitably complicated, and in performing maintenance work for service, it is very hard to perform disassembling end reassembling of the assembled finished product.

On the other hand, with regard to the size of the disk drive, there is a demand for decreasing the size of the disk drive concerning not only the portable types but also those that are assembled into audio devices for home use and on-board automobile use.

The present invention has been made in view of the aforementioned conventional technical problems and has an object to improve the productivity and serviceability in assembly by exalting the assembling performance of a disk drive, and for decreasing the size of the disk drive.

According to a first aspect of the present invention, there is provided a disk drive comprising: a recording and reproducing unit for recording information on a recording and/or reproducing medium encased in a disk cartridge or reproducing the information recorded on the medium; a holder for guiding and holding the disk cartridge that is being inserted; a transfer member (slider) for transferring the disk cartridge between a mounting and dismounting position where the disk cartridge can be mounted on and dismounted from the holder and an insertion completed position where the disk cartridge is completely inserted in the holder; a drive mechanism which has an electric motor and an output trasmission mechanism thereof and is capable of driving the transfer member; and a chassis that serves as a mounting base for these principal components, the disk drive being constructed of two units of a holder unit obtained by mounting the transfer member on the holder and a chassis unit obtained by mounting the recording and reproducing unit and the drive mechanism on the chassis, the chassis being provided with a pivot support portion for supporting the holder pivotally in the vertical direction, the transfer member and the drive mechanism being provided with engagement portions to be engaged with each other in the vertical direction, and the holder unit being assembled with the chassis pivotally in the vertical direction in a state in which the transfer member and the drive mechanism are engaged with each other in the vertical direction.

By adopting this construction, the final assembling of the disk drive can be achieved by the simple work of supporting the pivot of the holder by the pivot support of the chassis and pivoting downward the holder while engaging the transfer member with the drive mechanism in the vertical direction. That is, the holder unit can be assembled with the chassis unit only by the pivot operation, and both the units are engaged with each other by only one portion. Therefore, the assembling work (as well as the disassembling work) of both the units can be very easily achieved.

According to a second aspect of the present invention, based on the above first aspect of the present invention, a first cam element is provided on the chassis unit side, a second cam element to be coupled with the first cam element is provided on the holder unit side and the holder unit is assembled with the chassis, whereby both the cam elements are coupled with each other in the vertical direction, forming a cam mechanism for vertically moving the disk cartridge between the insertion completed position and the recording and reproducing position of the recording and reproducing unit.

With this arrangement, the vertical movement mechanism can be provided with a relatively simple construction. By lowering the disk cartridge by the cam mechanism from the insertion completed position to the recording and reproducing position in addition to transferring the disk cartridge from the mounting and dismounting position to the insertion completed position by the transfer member, a loading operation sequence can be performed. In this case, both the cam elements are coupled with each other in the vertical direction, and therefore, the pivot operation of the holder unit in assembling the holder unit with the chassis is not hindered.

Furthermore, according to a third aspect of the present invention, there is provided a disk drive comprising: a recording and reproducing unit for recording information on a recording and/or reproducing medium encased in a disk cartridge or reproducing the information recorded on the medium; a holder for guiding and holding the disk cartridge that is being inserted; a transfer member (slider) for transferring the disk cartridge between a mounting and dismounting position where the disk cartridge can be mounted on and dismounted from the holder and an insertion completed position where the disk cartridge is completely inserted in the holder; a vertical movement mechanism for vertically moving the disk cartridge between the insertion completed position and the recording and reproducing position of the recording and reproducing unit by a cam mechanism; a drive mechanism capable of driving the transfer member and the vertical movement mechanism; and a chassis that serves as a mounting base for these principal components, the drive mechanism comprising: first and second rack members that are slidably arranged opposite to each other on the chassis; a drive gear that is arranged between both the rack members and is able to mesh with a toothed portion of each of the rack members; and a switch lever that can engage with both the rack members and switches a state of meshing of the toothed portion of each of the rack members with the drive gear, the first rack member being provided with a first engagement portion to be engaged with the transfer member, the second rack member being provided with a second engagement portion that serves as part of the vertical movement mechanism, whereby either one of the rack members is made to slide to a specified position by rotation of the drive gear meshed with the toothed portion thereof and thereafter the switch lever effects a switching operation so that the toothed portion of the other rack member meshes with the drive gear, consequently sliding the other rack member to a specified position in a direction opposite to the direction in which the one rack member slides.

In this case, the two rack members that have different roles can be driven in opposite directions by one drive gear, and the switch lever switches the state of meshing of this drive gear with the toothed portion of each of the rack members, thereby driving each of the rack members with an appropriate timing. With this arrangement, the structure can be simplified and decreased in size as compared with the case where the above two rack members are separately provided. Particularly, the disk drive can be decreased in size in the transfer direction of the disk cartridge.

Furthermore, according to a fourth aspect of the present invention, based on the above third aspect of the present invention, when the disk cartridge is loaded from the mounting and dismounting position to the recording and reproducing position, the first rack member is driven by the drive gear to slide to a specified position corresponding to the insertion completed position of the disk cartridge and thereafter the switch lever effects a switching operation so that the toothed portion of the second rack member meshes with the drive gear, consequently sliding the second rack member to a specified position corresponding to the recording and reproducing position of the disk cartridge.

In this case, the slide operation of both the rack members is switched in accordance with an appropriate timing, by which the transfer of the disk cartridge from the mounting and dismounting position to the insertion completed position and the lowering operation from this insertion completed position to the recording and reproducing position are performed as a loading operation sequence.

Furthermore, according to a fifth aspect of the present invention, based on the above fourth aspect of the present invention, the second rack member is provided with a third engagement portion to be engaged with a support member side of a magnetic head of the recording and reproducing unit and the second rack member is made to slide to the specified position corresponding to the recording and reproducing position of the disk cartridge and thereafter made to slide further in the same direction, consequently driving the support member to set the magnetic head into a recordable state. In this case, a further role is assigned to the second rack member, so that the further compacting of the disk drive can be achieved.

In the first aspect of the present invention, the disk drive is constructed of the two units of the holder unit and the chassis unit, and the holder unit is assembled with the chassis pivotally in the vertical direction in the state in which the transfer member and the drive mechanism are engaged with each other in the vertical direction. With this arrangement, the final assembling of the disk drive can be achieved by the simple work of supporting the pivot of the holder by the pivot support of the chassis and pivoting downward the holder while engaging the transfer member with the drive mechanism in the vertical direction. That is, the holder unit can be assembled with the chassis unit only by the pivot operation, and both the units are engaged with each other by only one portion. Therefore, the assembling work (as well as the disassembling work) of both the units can be very easily achieved.

As a result, the productivity in the assembling work of the disk drive can be remarkably improved. Furthermore, the serviceability is also remarkably improved.

Also, in the second aspect of the present invention, basically the same effect as that of the above first aspect of the present invention can be produced. Furthermore, by assembling the holder unit with the chassis, the first cam element provided on the chassis unit side and the second cam element provided on the holder unit side are coupled with each other in the vertical direction, consequently forming the cam mechanism for vertically moving the disk cartridge between the insertion completed position and the recording and reproducing position of the recording and reproducing unit. Therefore, the vertical movement mechanism can be provided with a relatively simple construction. By lowering the disk cartridge by the cam mechanism from the insertion completed position to the recording and reproducing position in addition to transferring the disk cartridge from the mounting and dismounting position to the insertion completed position by the transfer member, a loading operation sequence can be performed.

Furthermore, in the third aspect of the present invention, the first rack member provided with the first engagement portion to be engaged with the transfer member and the second rack member provided with the second engagement portion that serves as part of the vertical movement mechanism are slidably arranged oppositely to each other on the chassis. The drive gear is arranged between both these rack members, and the switch lever for switching the state of meshing of the toothed portion of each of the rack members with the drive gear is provided while being able to engage with both the rack members. Either one of the rack members is made to slide to the specified position by the rotation of the drive gear and thereafter the switch lever effects a switching operation so that the toothed portion of the other rack member meshes with the drive gear, consequently sliding the other rack member to the specified position in the direction opposite to the direction in which one rack member slides. Therefore, the two rack members that originally have different roles can be driven in opposite directions by the one drive gear, and the state of meshing of this drive gear with each of the rack members is switched by the switch lever, thereby allowing the rack members to be each driven with an appropriate timing.

With this arrangement, the structure can be simplified and decreased in size as compared with the case where the above two rack members are separately provided. Particularly the disk drive can be decreased in size in the transfer direction of the disk cartridge.

Furthermore, in the fourth aspect of the present invention, basically the same effect as that of the above third aspect of the present invention can be produced. Particularly, when the disk cartridge is loaded from the mounting and dismounting position to the recording and reproducing position, the first rack member is made to slide to the specified position corresponding to the insertion completed position of the disk cartridge and thereafter the switch lever effects a switching operation to slide the second rack member to the specified position corresponding to the recording and reproducing position of the disk cartridge. With this arrangement, the slide operation of both the rack members is switched in accordance with an appropriate timing, by which the transfer of the disk cartridge from the mounting and dismounting position to the insertion completed position and the lowering operation from this insertion completed position to the recording and reproducing position can be performed as a loading operation sequence.

Furthermore, in the fifth aspect of the present invention, basically the same effect as that of the above fourth aspect of the present invention can be produced. Moreover, the second rack member is provided with the third engagement portion to be engaged with the support member side of the magnetic head of the recording and reproducing unit. The second rack member is made to slide to the specified position corresponding to the recording and reproducing position of the disk cartridge and thereafter made to slide further in the same direction, thereby driving the support member to set the magnetic head into the recordable state. With this arrangement, a further role is assigned to the second rack member, so that decreasing the size of the disk drive can be achieved.

DETAILED DESCRIPTION OF THE PREFERRED EMBODIMENTS

Preferred embodiments of the present invention will be described in detail below with reference to the accompanying drawings.

Figure 1:
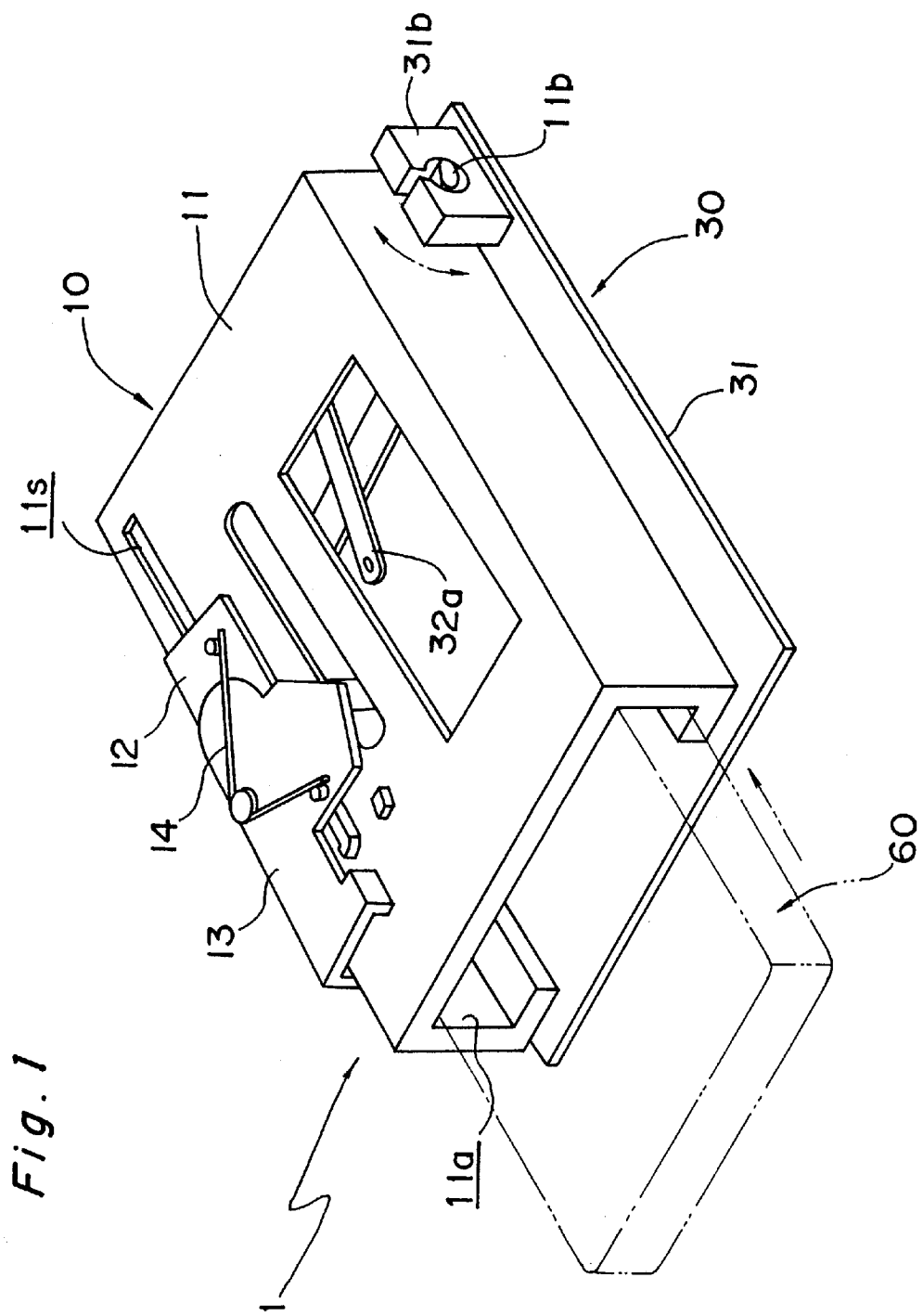
FIG. 1 is an overall perspective view of a disk drive according to an embodiment of the present invention.

FIG. 1 is an overall perspective view of a disk drive 1 according to an embodiment of the present invention. As shown in this figure, the disk drive 1 (occasionally referred to simply as a "unit" hereinafter) is basically constructed of a holder unit 10 provided with a holder 11 for encasing and holding a disk cartridge 60 (occasionally referred to simply as a "cartridge" hereinafter) in which the so-called minidisk (MD) that serves as a recording and/or reproducing medium is encased and a chassis unit 30 provided with a flat-plate-shaped chassis 31 that serves as a mounting base for the principal components of the unit 1. The holder unit 10 is supported pivotally in the vertical direction (i.e., perpendicular direction) with respect to the chassis unit 30 about a portion near the end portion on the side opposite to the cartridge insertion side, as described later.

The construction of these units 10 and 30 and the operation of the disk drive 1 will be successively described below.

Figure 2:
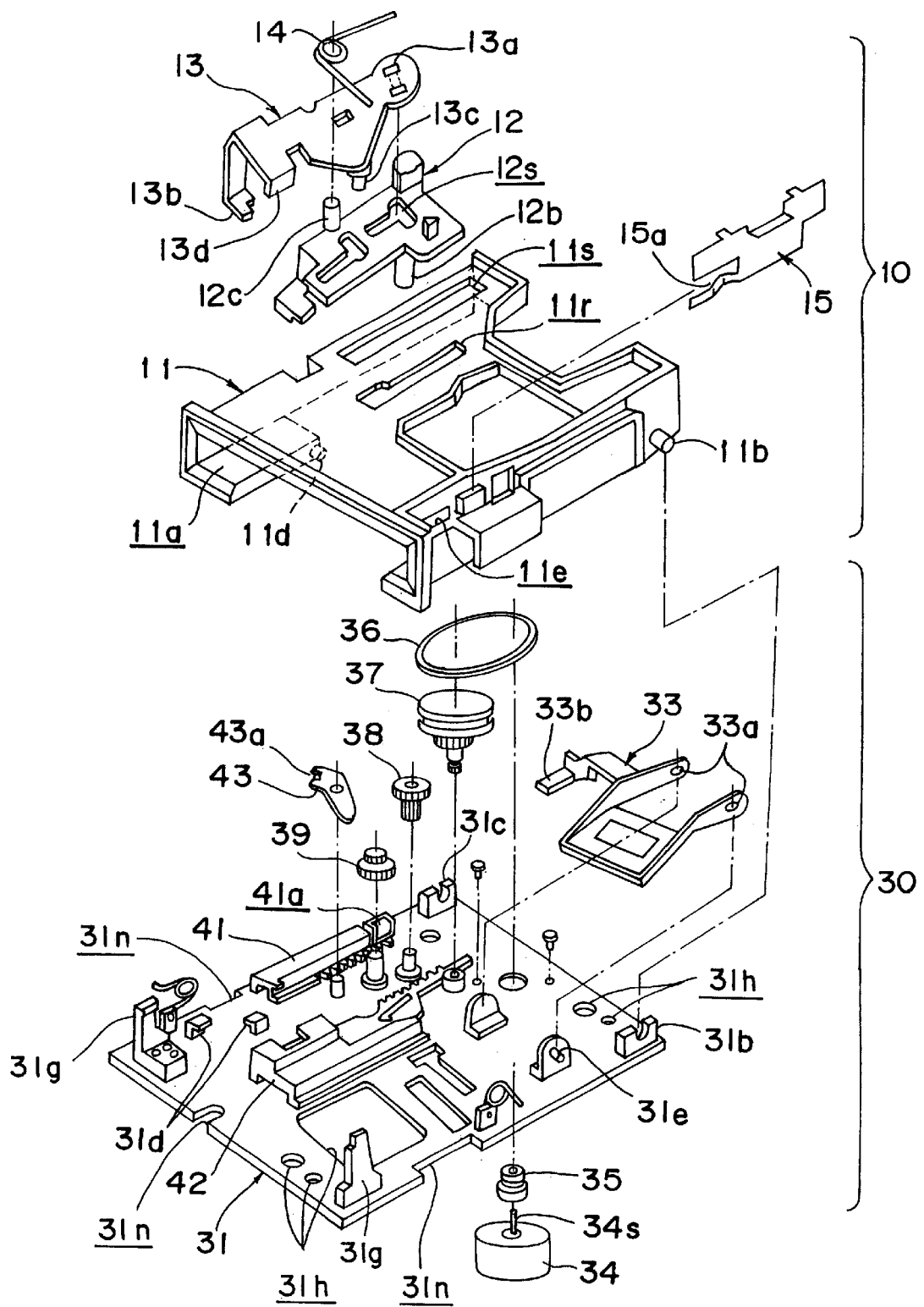
FIG. 2 is an exploded perspective view of the holder unit and the chassis unit of the above disk drive.
Figure 3:
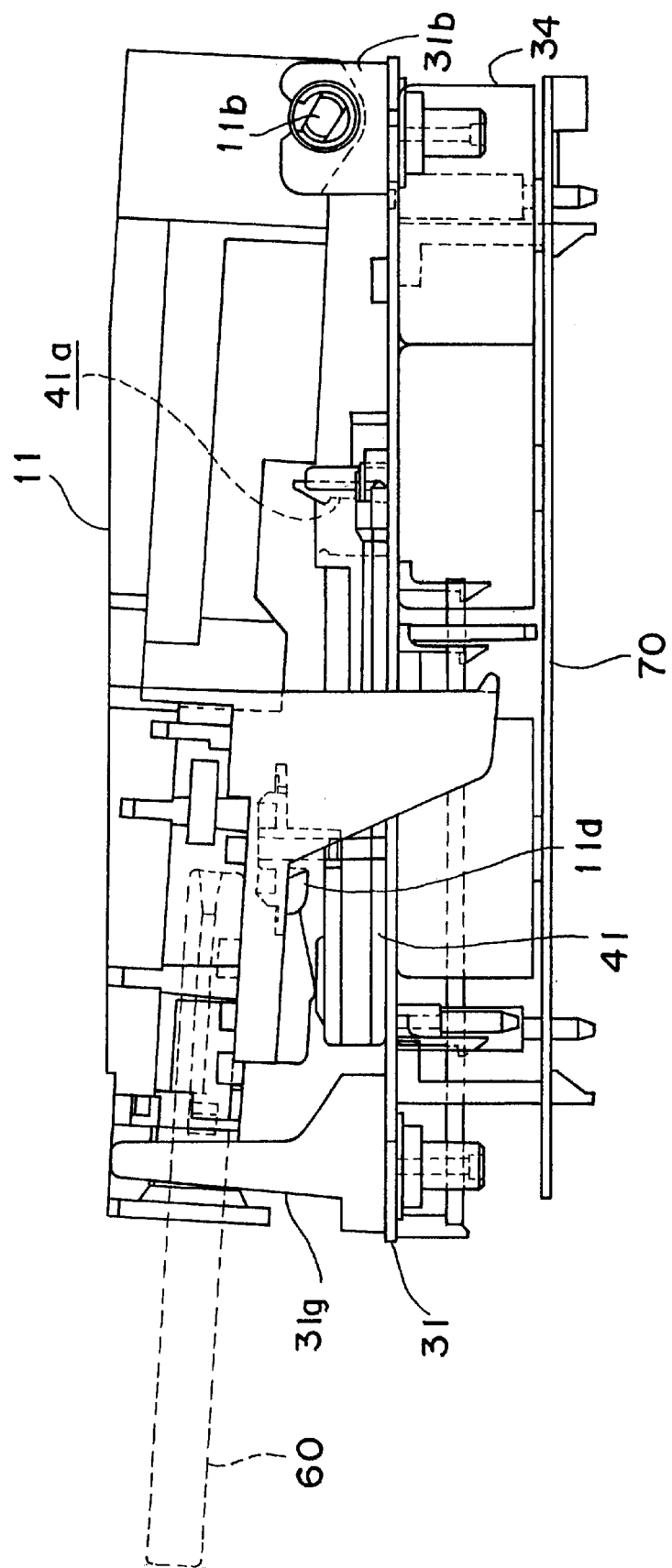
FIG. 3 is an explanatory side view of the above disk drive in the assembled state.
Figure 4:
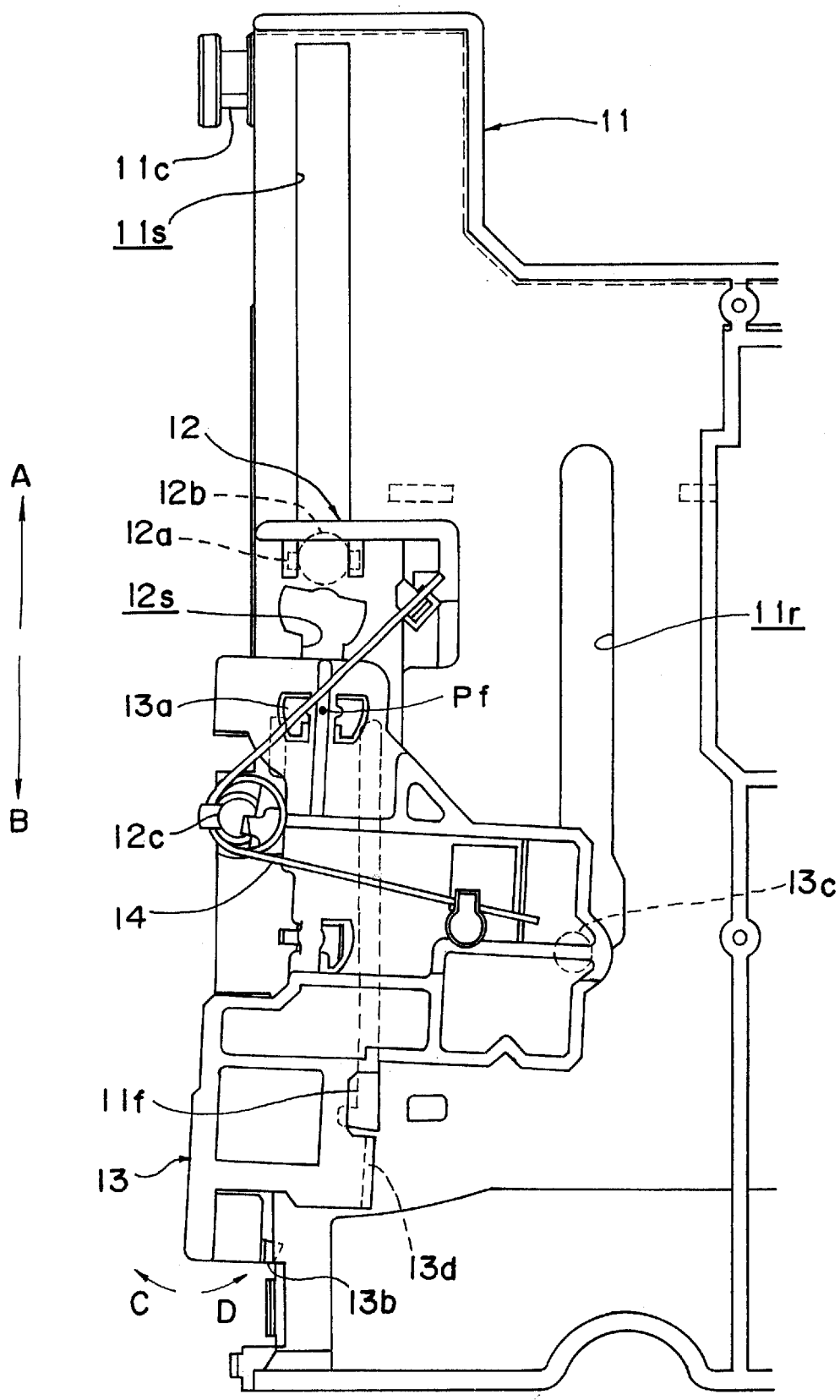
FIG. 4 is an explanatory plan view of the above holder unit.
Figure 5:
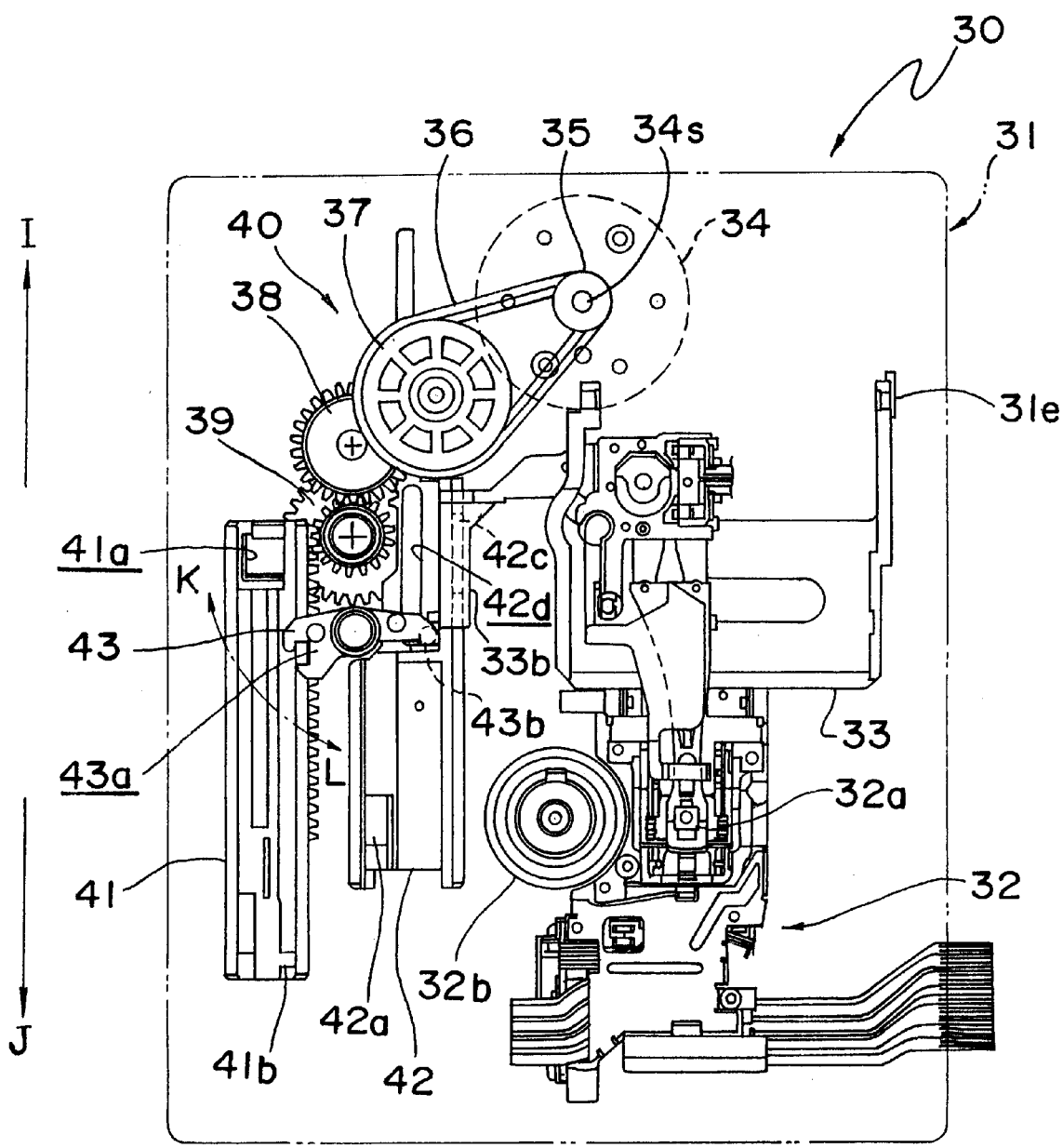
FIG. 5 is an explanatory plan view of the above chassis unit.
Figure 6:
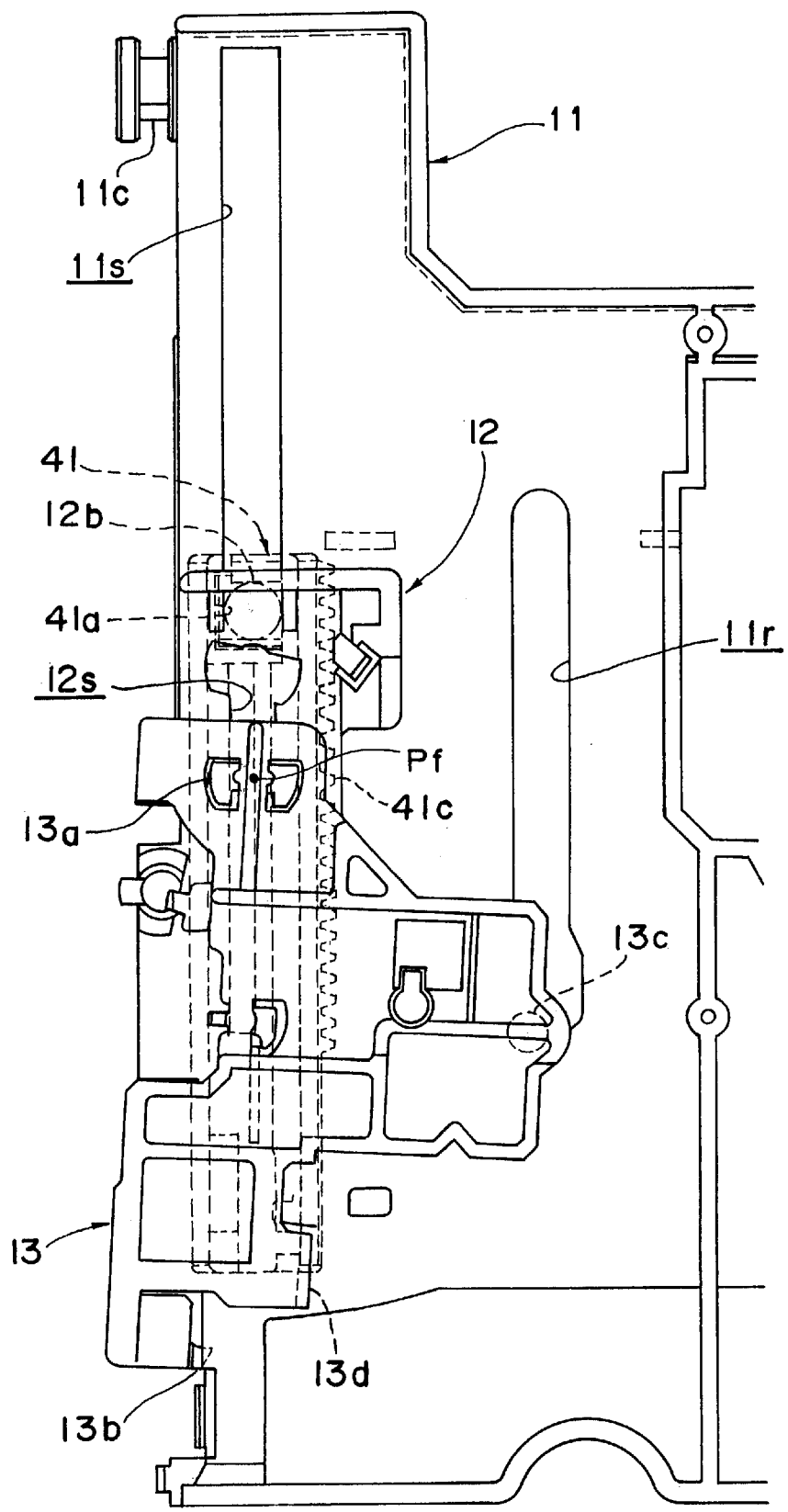
FIG. 6 is an explanatory plan view showing an associated state in which a slider of the above holder unit is associated with a drive mechanism of the chassis unit.
Figure 7:
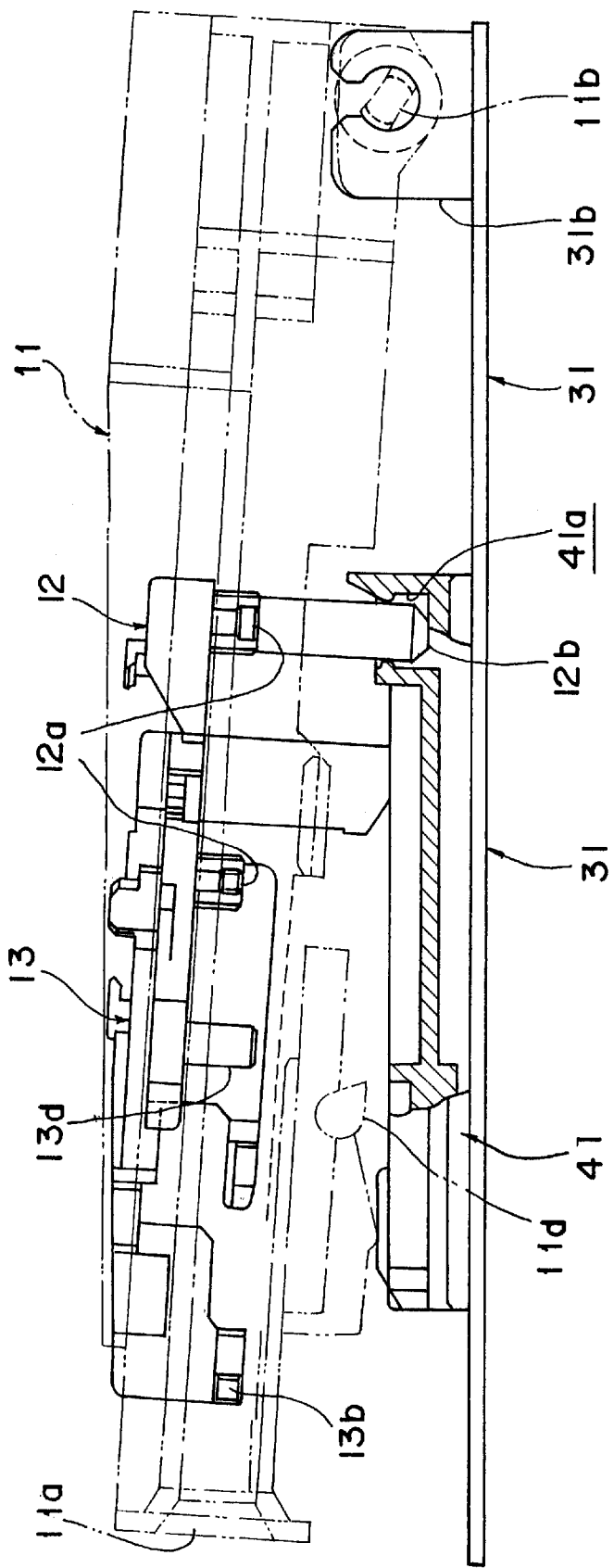
FIG. 7 is an explanatory side view showing an associated state in which the slider of the above holder unit is associated with the drive mechanism of the chassis unit.
Figure 18:
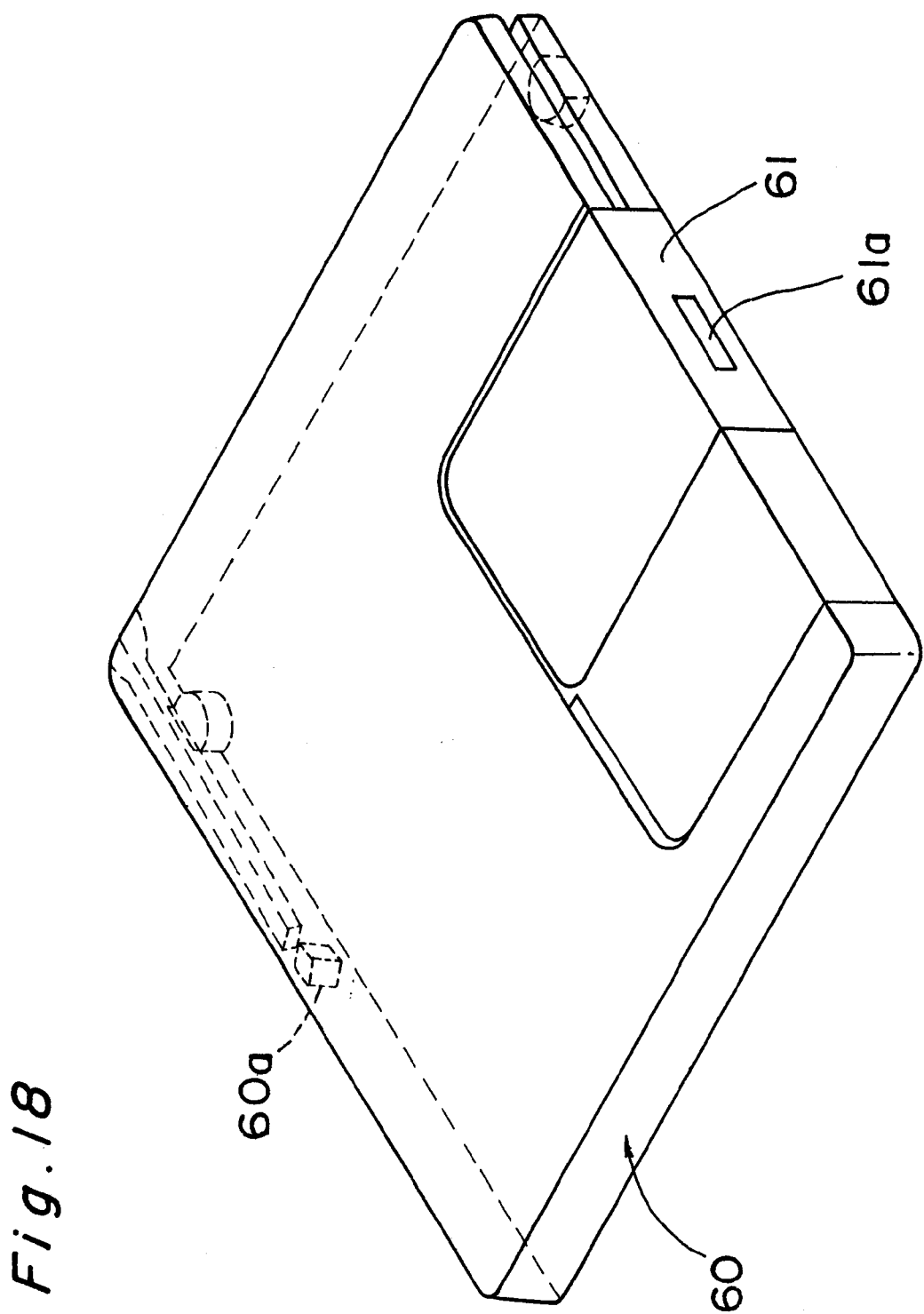
FIG. 18 is an overall perspective view of the above disk cartridge.

FIG. 2 is an exploded perspective view of the holder unit 10 and the chassis unit 30. FIG. 3 is an explanatory side view of the whole body of the disk drive in the assembled state. FIG. 4 is an explanatory plan view of the holder unit 10. FIG. 5 is an explanatory plan view of the chassis unit 30. FIG. 6 is an explanatory plan view showing an associated state in which a loading mechanism of the holder unit 10 is associated with a drive mechanism of the chassis unit 30. FIG. 7 is an explanatory side view showing the associated state of FIG. 6. It is to be noted that the construction of the disk cartridge 60 is shown in the perspective view of FIG. 18.

The construction of the holder unit 10 will be described first.

This holder unit 10 has the holder 11 that serves as the main body of the holder unit 10 and guides, receives and holds the disk cartridge 60 that is being inserted, and this holder 11 is basically mounted with a slider 12 that transfers the disk cartridge 60 that is being inserted into the unit 1, a lock lever 13 for locking and unlocking the disk cartridge 60 that is being inserted with respect to the slider 12 and Et shutter opener 15 for opening and closing a shutter 61 of the cartridge 60. It is to be noted that the holder 11 corresponds to the holder stated in the claims of the present application.

The holder 11 has one end provided with an opening 11a for receiving the disk cartridge 60 and the other end provided with a pair of pivot pins 11b and 11c (only the pivot pin 11b on one side is shown in FIG. 1 and FIG. 2) that serve as pivots for a pivoting operation in the vertical direction of the holder 11 while projecting laterally outward.

The bottom surface of the holder 11 is provided with an engagement projection 11d to be engaged with a drive mechanism capable of driving a loading mechanism including the slider 12 as described later. It is to be noted that the drive mechanism is provided on the chassis unit 30.

The slider 12 has a hook portion 12a (see FIG. 4) on the lower surface side, and this hook section 12a is slidably engaged with an elongated groove 11s cut in the holder 11. This elongated groove 11s extends in a direction in which the cartridge 60 is inserted or ejected (the direction of arrow A/B shown in FIG. 4), and the hook section 12a (i.e., the slider 12) can move in the above direction (direction A/B) within the range of this elongated groove 11s.

The disk cartridge 60 being inserted from the holder opening 11a is transferred into the unit 1 in accordance with the movement of this slider 12.

The slider 12 is provided with an engagement pin 12b that has a specified length and extends downward, and as described later, this engagement pin 12b comes into engagement with the drive mechanism on the chassis unit 30 side.

It is to be noted that this slider 12 is to transfer the disk cartridge 60 between the mounting and dismounting position where the cartridge can be mounted and dismounted from the holder 11 and an insertion completed position where the cartridge is completely positioned with respect to the holder 11. The slider 12 may be referred to as the transfer member, and constitutes part of the loading mechanism capable of transferring the cartridge between the above mounting and dismounting position and a recording and reproducing position of the recording and reproducing unit (described later).

The lock lever 13 has a hook portion 13a on the lower surface side, and this hook portion 13a is slidably engaged with an elongated groove 12s cut in the slider 12. This elongated groove 12s extends in the insertion/ejection direction (direction A/B, see FIG. 4) of the cartridge 60 in a state in which the slider 12 is assembled with the holder 11. The hook portion 13a (i.e., the lock lever 13) is able to move in the above direction (direction A/B) within the range of this elongated groove 12s and is able to pivot around a center Pf of the hook portion 13a (i.e., in the direction of arrow C/D shown in FIG. 4).

This lock lever 13 is always urged in the direction of arrow C by a spring 14 (lock lever spring) mounted around a pin 12c projecting on the upper surface side of the slider 12. Further, a lock pawl 13b for pulling and retaining the cartridge 60 is provided on the leading end side of the lock lever 13 while being engaged with a side recess 60a provided on one side surface of the disk cartridge 60.

The shutter opener 15 has an engagement hook portion 15a to be engaged with a shutter hole 61a bored in the shutter 61 of the disk cartridge 60 and is mounted and fixed relatively close to the cartridge insertion side end portion of the side portion of the holder 11.

On a side portion of this holder 11 is formed a window 11e relatively close to the cartridge insertion side end portion, and the shutter opener 15 is mounted so that its hook portion 15a projects inwardly of the window 11e.

When the disk cartridge 60 is inserted from the opening 11a into the holder 11, the engagement hook portion 15a of the shutter opener 15 comes into engagement with the shutter hole 61a of the cartridge 60, by which the shutter 61 is opened in accordance with the progress of the inserting operation of the cartridge 60.

The chassis unit 30 will be described next.

This chassis unit 30 is provided with a flat-plate-shaped chassis 31 that serves as the mounting base of the principal components of the disk drive of the disk drive 1, and this flat-plate-shaped chassis 31 is mounted with a recording and reproducing unit 32 for recording information on a recording and/or reproducing medium encased in the disk cartridge 60 or reproducing the information recorded on the medium, a head shifter 33 for vertically moving a magnetic head 32a of the recording and reproducing unit 32, a drive mechanism capable of driving the loading mechanism including the slider 12 provided for the holder unit 10 and so on.

As described above, the holder 11 is also supported pivotally around the pivot pins 11b and 11c provided at the end portion oppositely to the opening side in the vertical direction with respect to the flat-plate-shaped chassis 31.

The flat-plate-shaped chassis 31 is obtained by cutting a steel plate material of, for example, a specified thickness into a specified planar shape (rectangular shape in the present embodiment) by a shearing process or the like and punching a plurality of holes 31h and cut portions 31n through specified portions of the plate material. The plate material is subjected to neither bending process nor emboss process, and therefore, the planar portion remains flat.

That is, more preferably, the flat-plate-shaped chassis 31 is set to a specified thickness and the base portion except for the hole 31h and the cut portion 31n is formed flat throughout the entire surface. Therefore, as compared with the conventional case of the bending process or the like, the construction itself of the chassis 31 is substantially simplified, and the dimensional (thickness) accuracy and form (flatness) accuracy are also remarkably improved. Therefore, the accuracy of the assembled state of the principal components can be very easily assured, so that the high-accuracy operation of the disk drive 1 can be guaranteed without specifically necessitating troublesome adjustment or the like. Therefore, the productivity in the assembling work of the disk drive 1 can be remarkably improved, and the assembling performance is also remarkably improved.

At least part of the plurality of holes 31h and/or the cut portions 31n is used for mounting (fixing, supporting or engaging) the constituent elements of the principal components of the disk drive or the other accessory parts on the chassis 31, where the constituent elements or the other accessory parts are mounted on the specified holes 31h and/or the cut portions 31n directly or via a mounting member. Therefore, the constituent elements of the principal components or the other accessory parts are mounted on the chassis in a correctly positioned state without any trouble.

It is to be noted that the remaining holes 31h and/or the cut portions 31n, being not used for the mounting of the constituent elements of the principal components and/or the other accessory parts play the role of reducing the weight of the flat-plate-shaped chassis 31 as, for example, through holes 31h and/or cut portions 31n.

More preferably, prior to the mounting of the constituent elements of the principal components of the disk drive and/or the other accessory parts and/or the their mounting members, the base portion of the flat chassis 31 except for the holes 31h and the cut portions 31n is subjected to the so-called leveling process. As is well known, this leveling process uses a leveling unit (the so-called leveler) provided with a pair of pressure rollers arranged at specified regular intervals and controls the thickness dimension and flatness of the plate material with extremely high accuracy by leveling the thickness and surface of the plate material by making the plate pass through the space between the pressure rollers. By subjecting the chassis 31 to this leveling process, the thickness dimension and the flatness of the chassis 31 can be stably controlled with higher accuracy.

Further, more preferably, the constituent elements of the principal components and/or the other accessory parts and/or their mounting members are made of synthetic resin and are integrally formed with the chassis 31 by outsert molding subsequently to the leveling process.

This outsert molding is to integrally form the mounting holes 31h and/or cut portions 31n of the chassis 31 with the specified elements by preparing a pair of molds provided with a molding cavity corresponding to the necessary elements (the constituent elements of the principal components and/or the other accessory parts and/or their mounting members), putting the molds close to each other with the chassis 31 interposed between these molds and injecting molten resin into the molding cavity. By this process, the mounting of the constituent elements of the principal components and/or the other accessory parts and/or their mounting members on the chassis 31 can be very efficiently performed with high accuracy without specifically impairing the dimensional accuracy and form accuracy of the chassis 31.

Instead of such an outsert molding, it is acceptable to mount the necessary elements on the corresponding mounting holes 31h and/or the cut portions 31n by screwing or "caulking" or the like.

The leveling process and outsert molding are similar to those which have been conventionally well known, and therefore, neither detailed description nor illustration thereof is provided for the processes.

On the one end side of the flat-plate-shaped chassis 31 are provided bearing portions 31b and 31c for supporting the pivot pins 11b and 11c of the holder 11. The holder 11 can pivot in the vertical direction with respect to the flat-plate-shaped chassis 31 with the pivot pins 11b and 11c supported by the bearing portions 31b and 31c.

The bearing portions 31b and 31c have their upper portions opening upward, so that the pivot pins 11b and 11c of the holder 11 can be very easily (with a one-touch motion) fitted into the bearing portions from the opening for the assembling. The bearing portions 31b and 31c correspond to the "pivot support" stated in the claim 1 of the present application.

As an example of the mounting member of the principal components of the disk drive or the constituent elements, the bearing portions 31b and 31c can be enumerated. As an example of the other accessory parts, a pair of plate-shaped engagement members 31g that are provided on one end side of the chassis 31 and extend upward as shown in FIG. 2 can be enumerated. The engagement members 31g are to engage the holder 11 in the assembled state with the chassis 31.

An electric motor 34 for driving the loading mechanism is fixed by a screw member on the lower surface side of the chassis 31 as described later. On the output side of the electric motor 34 is provided an output transmission mechanism 40 (see FIG. 5) for transmitting the rotation of the electric motor 34 while reducing the rotating speed. Below the chassis 31 is arranged a control board 70 (see FIG. 3) on which a control circuit of the disk drive 1 is formed, and the electric motor 34 is electrically connected to this control board 70.

The output transmission mechanism 40 is constructed of a motor pulley 35 to be fixed on an output shaft 34s of the electric motor 34, a power transmission belt 36, a pulley gear 37, an intermediate gear 38, a drive gear 39 and so on. The output of the electric motor 34 is transmitted via the motor pulley 35 and the power transmission belt 36 to the pulley gear 37 and thereafter transmitted to the drive gear 39 via the intermediate gear 38 meshed with a lower gear of the pulley gear 37.

On both sides of the drive gear 39, in terms of plan view, a pair of rack members (main rack 41 and sub-rack 42) having a toothed portion capable of meshing with the drive gear 39 are arranged opposite to each other, and both the racks 41 and 42 are slidably held and guided on the chassis 31 by a plurality of guide hooks 31d (see FIG. 2). With the rotation of the drive gear 39 as described later, the racks can move in the direction of arrow I/J shown in FIG. 5.

A side cam portion 42a is formed on the upper surface of the side portion on the leading end side of the sub-rack 42, and as described later, this side cam portion 42a comes into engagement with the engagement projection 11d of the holder 11 according to the operation state of the disk drive 1.

An engagement pin 12b provided at the slider 12 on the holder unit 10 side is engaged from above with a recess 41a formed on one end side of the main rack 41.

The recess 41a of the main rack 41 and the engagement pin 12b of the slider 12 may be referred to as the engagement portions that engage with each other in the vertical direction, and among these, the recess 41a of the main rack 41 may be referred to as the first engagement portion.

The side cam portion 42a of the sub-rack 42 and the engagement projection 11d of the holder 11 respectively may be referred to as the first cam element and the second cam element, and among these, the side cam portion 42a of the sub-rack 42 also may be referred to as the second engagement portion. The side cam portion 42a and the engagement projection 11d may be referred to as the vertical movement mechanism.

Further, the main rack 41 and the sub-rack 42, respectively may be referred to as the first rack member and the second rack member.

In the present embodiment, when assembling the holder unit 10 with the chassis unit 30 in the assembling process of the disk drive 1, more preferably, basically only the engagement pin 12b of the slider 12 is to be engaged with the recess 41a of the main rack 41.

Therefore, by individually sub-assembling the holder unit 10 and the chassis unit 30, thereafter fitting the pivot pins 11b and 11c of the holder 11 into the bearing portions 31b and 31c of the chassis 31 in a state in which the engagement pin 12b is preparatorily positioned so as to be fitted in the recess 41a of the main rack 41 and pivoting the holder 11 downward, the holder unit 10 can be assembled very easily (with a one-touch motion) with the chassis unit 30.

As described above, according to the present embodiment, the disk drive 1 is constructed of the two units of the holder unit 10 and the chassis unit 30, and the holder 11 is assembled with the chassis 31 pivotally in the vertical direction in the state in which the engagement pin 12b of the slider 12 and the recess 41a of the main rack 41 are engaged with each other in the vertical direction. Therefore, the final assembling of the disk drive 1 can be achieved by the simple work of supporting the pivot pins 11b and 11c (pivot) of the holder 11 by the bearing portions 31b and 31c (pivot support) of the chassis 31 and pivoting downward the holder 11 while engaging the slider 12 with the main rack 41 of the drive mechanism in the vertical direction. That is, the holder unit 10 can be assembled with the chassis unit 30 only by the pivot operation, and both the units 10 and 30 are engaged with each other by only one portion. Therefore, the assembling work (as well as the disassembling work) of both the units can be very easily achieved.

As a result, the productivity in the assembling work of the disk drive 1 can be remarkably improved. Furthermore, the serviceability is also remarkably improved.

Furthermore, by assembling the holder unit 10 with the chassis 31, the side cam portion 42a (cam surface), that belongs to the sub-rack 42 and serves as the first cam element provided on the chassis unit 30 side, is engaged in the vertical direction with the engagement projection 11d (cam slider), that belongs to the holder 11 and serves as the second cam element provided on the holder unit 10 side, thereby constituting a cam mechanism for vertically moving the disk cartridge 60 between the insertion completed position and the recording and reproducing position of the recording and reproducing unit 32. Therefore, the vertical movement mechanism can be provided with a relatively simple construction, and by lowering the disk cartridge 60 by the cam mechanism from the insertion completed position to the recording and reproducing position in addition to transferring the disk cartridge from the mounting and dismounting position to the insertion completed position by the slider 12, a sequence of a loading operation can be performed. the slider 12, a sequence of a loading operation can be performed.

In this case, both the cam elements (side cam portion 42a and engagement projection 11d) are coupled with each other in the vertical direction, and therefore, the pivot operation of the holder unit 10 in assembling the holder unit 10 with the chassis 31 is not hindered.

Further, between both the rack members 41 and 42 is arranged a switch lever 43 capable of coming into engagement with both the members. The switch lever 43 switches over between the main rack 41 and the sub-rack 42 to be used as the counterpart of engagement of the drive gear 39, and the switch lever 43 is pivotally supported in the direction K/L (see the arrow of the one-dot chain line in FIG. 5) on the chassis 31.

If a projection 41b of the main rack 41 comes into engagement with a recess 43a provided at one end of the switch lever 43 to thereby pivot the switch lever 43 in the direction K (see FIG. 5) in accordance with the shift from the state in which the toothed portion of the main rack 41 is engaged with the drive gear 39 in the direction I (see FIG. 5) of the main rack 41, then the sub-rack 42 starts to operate to mesh the toothed portion thereof with the drive gear 39 since a pin 43b provided on the other end side of the switch lever 43 is engaged with a cam groove 42d of the sub-rack 42.

Consequently, if the main rack 41 moves in the direction I, then the sub-rack 42, which has been stopped, is moved in the direction J by the switch lever 43 in the vicinity of the terminal end of the movement.

The head shifter 33 that serves as a support member of the magnetic head 32a of the recording and reproducing unit 32 can arbitrarily pivot in the vertical direction, since a pair of pins 31e of the chassis 31 are inserted in a pair of holes 33a (see FIG. 2) provided on the rear side of the head shifter 33. Then, by this pivot operation, the magnetic head 32a of the recording and reproducing unit 32 are pivoted in the vertical direction. Below a side of this magnetic head 32a is positioned a turntable 32b.

An arm 33b is provided on the slide portion of the head shifter 33. The arm 33b is placed on an upper cam portion 42c of the sub-rack 42. The arm 33b moves on the upper cam portion 42c while being linked with the operation of the sub-rack 42, by which the arm 33b (i.e., the head shifter 33) pivots in the vertical direction. The upper surface cam portion 42c of the sub-rack 42 may be referred to as the third engagement portion.

The pair of pins 31e (see FIG. 2) that support the head shifter 33 pivotally in the vertical direction while being engaged with the holes 33a of the head shifter 33, the pair of bearing portions 31b and 31c (see FIG. 2) that support the holder 11 pivotally in the vertical direction while receiving the pivot pins 11b and 11c of the holder 11 and the plurality of guide hooks 31d (see FIG. 2) that slidably hold and guide the main rack 41 and the sub-rack 42 on the chassis 31 are the mounting members for mounting the principal components of the disk drive 1 on the chassis 31. As is clearly shown in FIG. 2, the chassis 31 is mounted with the constituent elements of the principal components of the disk drive 1 or the other accessory parts or mounting members for mounting these components on the chassis 31 besides the above elements.

Figure 8:
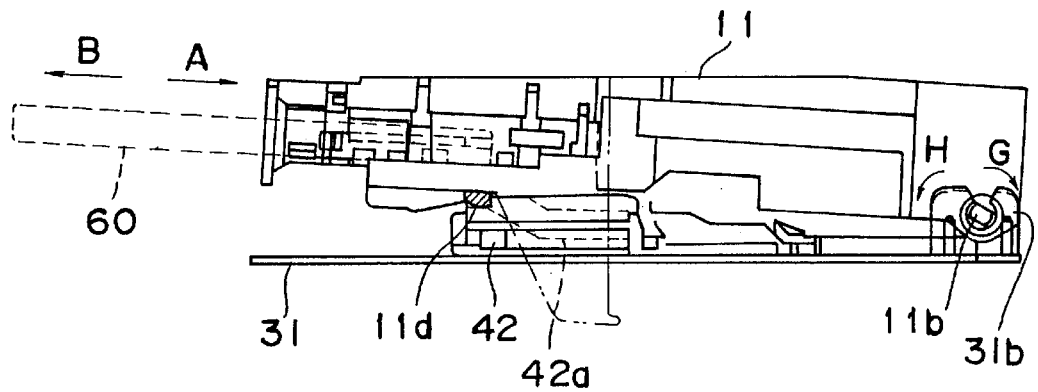
FIG. 8 is an explanatory side view showing an insertion start state when the above disk cartridge is being inserted into the holder.
Figure 9:
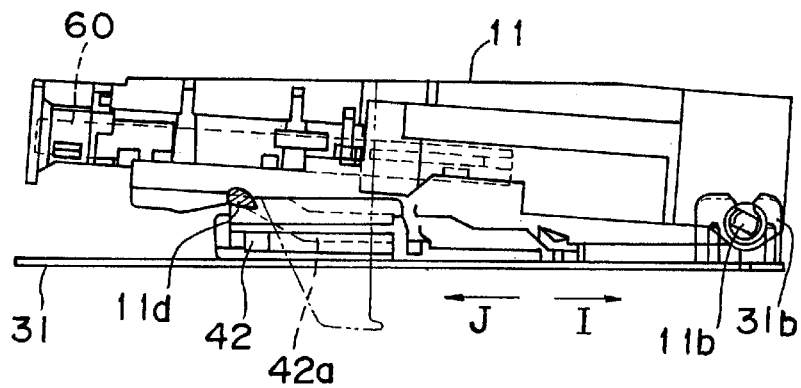
FIG. 9 is an explanatory side view showing an insertion completed state when the above disk cartridge is inserted in the holder.
Figure 10:
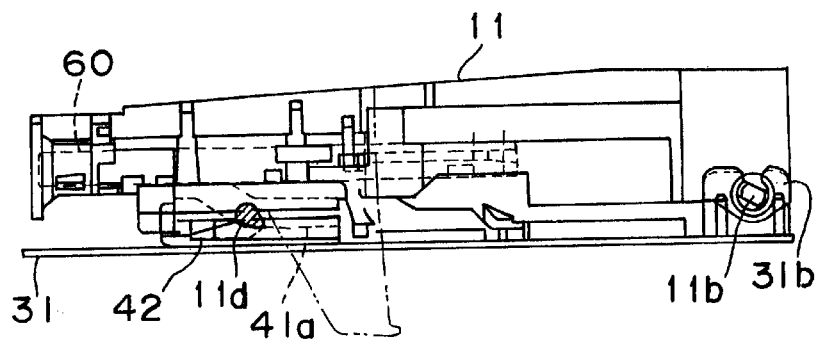
FIG. 10 is an explanatory side view showing a recording and reproducing enabled state when the above disk cartridge is inserted in the holder.

The basic operation in inserting the disk cartridge 60 into the holder 11 will be described next. FIGS. 8 through 10 are explanatory side views of the disk cartridge 60 and the disk drive 1, for explaining a sequence of operation in executing recording and reproducing by inserting the disk cartridge 60 into the holder 11. FIGS. 8, 9 and 10 show an insertion start (mounting and dismounting) position, an insertion completed (closing completed) position and a recording and reproducing position, respectively.

First, if the cartridge 60 is inserted from the mounting and dismounting position (see FIG. 8) into the holder 11, then the cartridge 60 is transferred from the mounting and dismounting position to the insertion completed position (FIG. 9) by the slider 12.

Then, the sub-rack 42 of the drive mechanism starts to move in the direction J (see FIG. 5). By this operation, the engagement projection 11d of the holder 11 comes into engagement from above with the side cam portion 42a of the sub-rack 42 and moves downward along this side cam portion 42a. This operation pivots the holder 11 in the direction H shown in FIG. 8 and moves the disk cartridge 60 into the recording and reproducing position (see FIG. 10), thereby putting the same into a recording and reproducing state.

That is, the disk cartridge 60 moves from the state of FIG. 8 via the state of FIG. 9 to the state of FIG. 10, and vice versa.

It is to be noted that the slider 12, the lock lever 13, the engagement projection 11d of the holder 11 and the side cam portion 42a of the sub-rack 42 may be referred to as the loading mechanism. That is, the principal portion of the loading mechanism except for the side cam portion 42a is entirely mounted on the holder unit 10.

The electric motor 34, the output transmission mechanism 40, the main rack 41, the sub-rack 42 and the switch lever 43 may be referred to as the drive mechanism, and these members are all mounted on the chassis unit 30.

Figure 11:
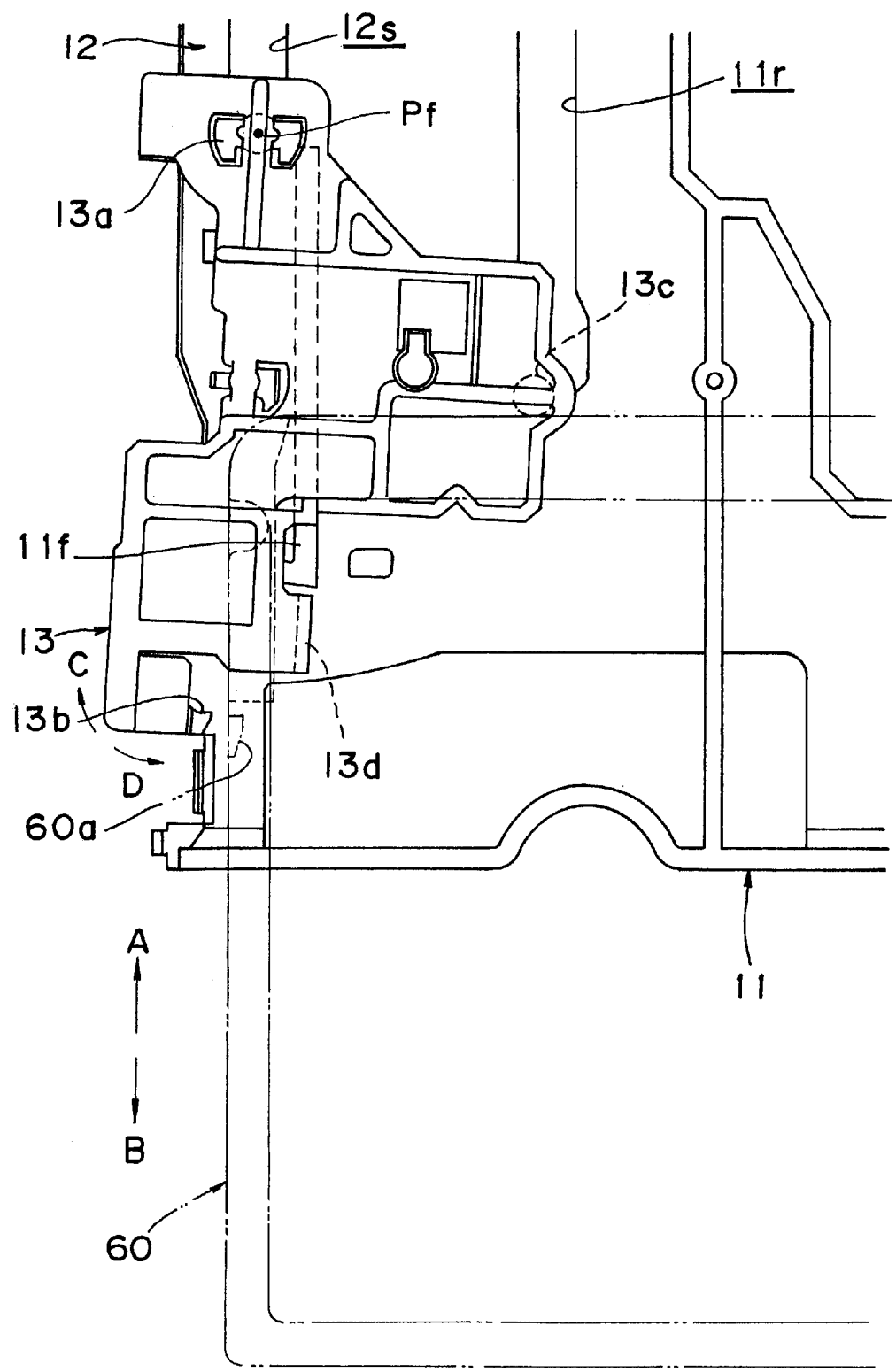
FIG. 11 is an explanatory plan view showing a lock lever disengaged state when the above disk cartridge is inserted in the holder.

The loading operation of the disk cartridge 60 will be described in more detail below with reference to FIG. 11 through FIG. 13.

If the cartridge 60 is manually inserted into the opening 11a of the holder 11 in the direction A in the mounting and dismounting position (corresponding to the FIG. 8 described above) of the disk cartridge 60 shown in FIG. 11, then the end surface of the cartridge 60 abuts against a cartridge receiving pin 13c of the lock lever 13, thereby making the lock lever 13 pivot in the direction of arrow D. By this operation, the lock pawl 13b of the lock lever 13 comes into engagement with a side recess 60a of the cartridge 60. In this stage, the further pivoting of the lock lever 13 in the direction D is prevented by the engagement of the lock pawl 13b with the side recess 60a of the cartridge 60.

It is to be noted that the cartridge receiving pin 13c is received in a guide groove 11r cut in the holder 11 while being able to freely slide within the range of this guide groove 11r.

When the disk cartridge 60 is further inserted in the direction A, a trigger switch (not shown) for issuing instructions for operating the drive mechanism operates, thereby transferring the cartridge 60 further in the direction A via the loading mechanism. It is to be noted that the trigger switch is electrically connected to the control board 70.

Figure 13:
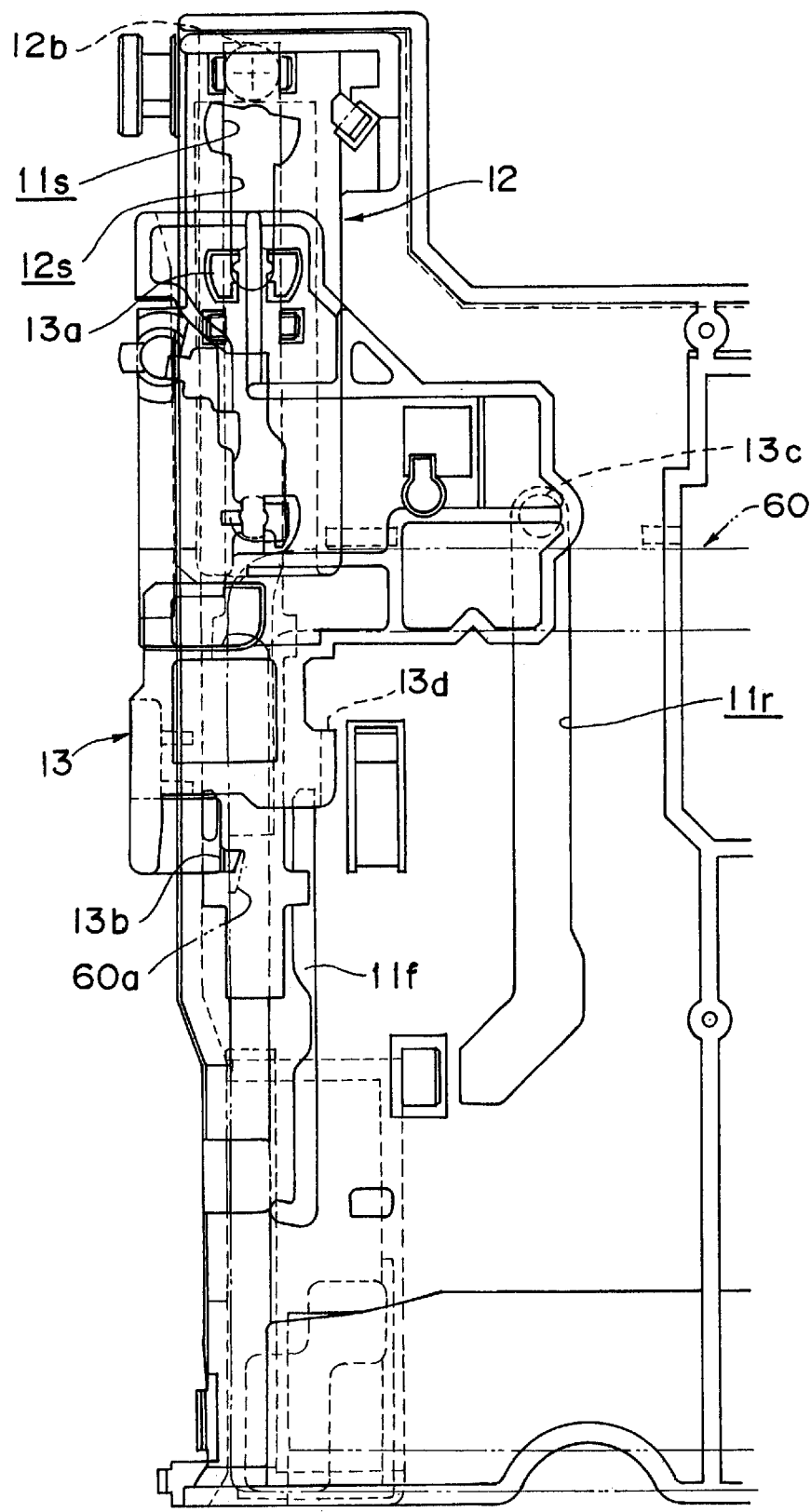
FIG. 13 is an explanatory plan view showing the insertion completed state in which the above disk cartridge is inserted in the holder.

FIG. 13 is a plan view (corresponding to FIG. 9 described above) showing the closing completed (insertion completed) state of the cartridge 60. In this closing completing operation, a regulating rib 11f of the holder 11 comes into engagement with a guide pawl 13d of the lock lever 13, and the guide pawl 13d slides along the regulating rib 11f, thereby preventing the lock lever 13 from pivoting in the direction C and securely transferring the cartridge 60 in the direction A.

Figure 12:
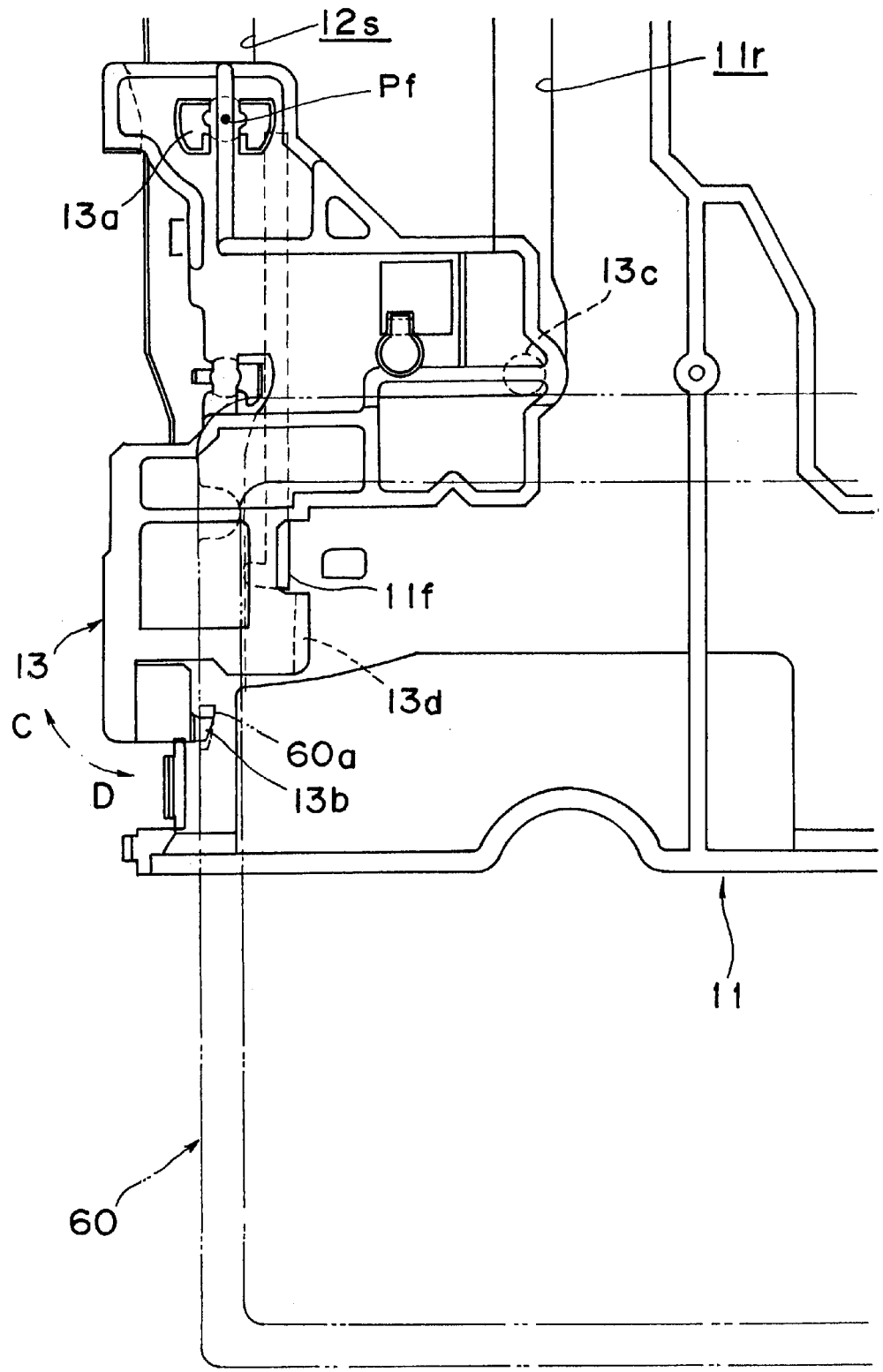
FIG. 12 is an explanatory plan view showing a lock lever engaged state when the above disk cartridge is inserted in the holder.
Figure 14:
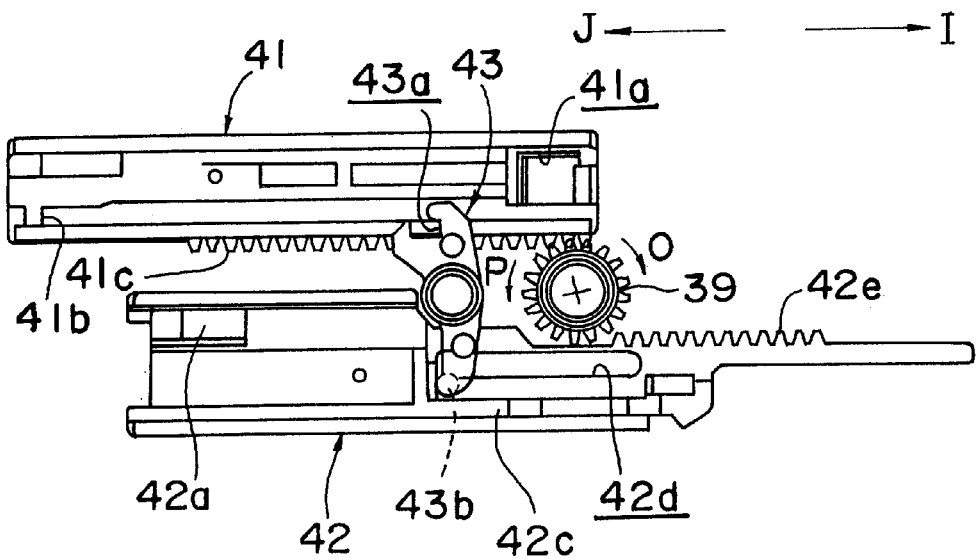
FIG. 14 is an explanatory plan view showing an operation state in which a main rack and a sub-rack operate in a disk cartridge mounting and dismounting position.

When the cartridge 60 is further pushed in the direction A from the state of FIG. 12 described above, the trigger switch (not shown) for issuing the instructions for operating the drive mechanism operates. By this operation, the electric motor 34 starts to rotate, with which the drive gear 39 starts to rotate in the direction of arrow 0 as shown in FIG. 14 successively via the motor pulley 35, power transmission belt 36, pulley gear 37 and intermediate gear 38, which serve as a speed reducing system constituting the output transmission mechanism 40. Then the drive gear 39 comes into meshing engagement with the toothed portion 41c provided on the main rack 41, thereby moving the main rack 41 in the direction of arrow I.

In this stage, the engagement pin 12b of the slider 12 is engaged with the recess 41a of the main rack 41. Therefore, the lock lever 13 placed on the slider 12 moves, by which the cartridge 60 engaged with the lock pawl 13b of the lock lever 13 moves in the direction A. It is to be noted that the sub-rack 42 is in the stopped state in this stage, when its toothed portion 42e does not mesh with the drive gear 39.

Figure 15:
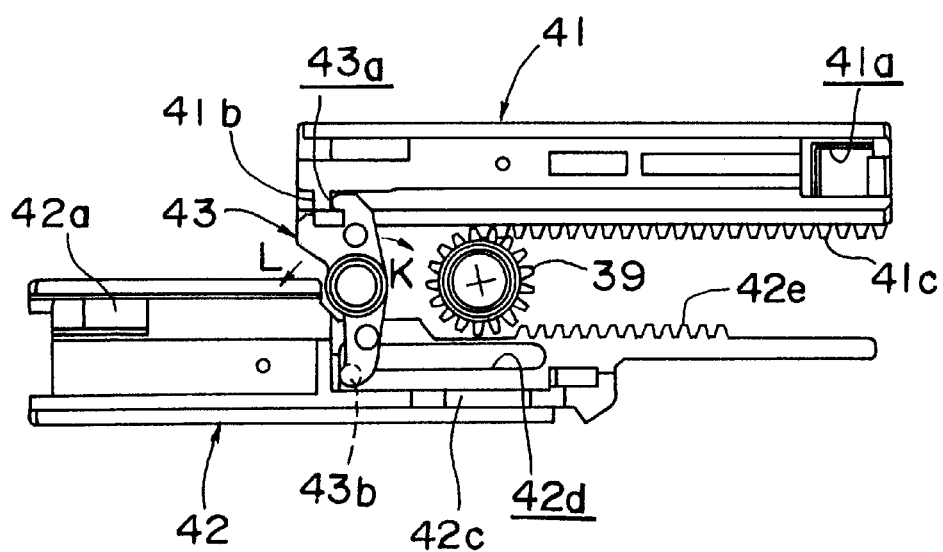
FIG. 15 is an explanatory plan view showing an operation state in which the main rack and the sub-rack operate in a disk cartridge insertion completed position.

The main rack 41 further advances in the direction I from this state, and when the main rack advances to the specified position shown in FIG. 15 (a position corresponding to the insertion completed position of the disk cartridge 60 in the holder 11), the projection 41b of the main rack 41 comes into engagement with the recess 43a of the switch lever 43, thereby pivoting the switch lever 43 in the direction K (see FIG. 15). By this operation, the pin 43b provided at one end of the switch lever 43 pushes the cam groove 42d of the sub-rack 42 in the direction J, by which the sub-rack 42 starts to slide in the same direction (i.e., the direction opposite to the direction in which the main rack 41 slides).

Next, when the main rack 41 further advances in the direction I, the toothed portion 42e of the sub-rack 42 comes into meshing engagement with the drive gear 39, and thereafter, the toothed portion 41c of the main rack 41 is disengaged from the drive gear 39.

Figure 16:
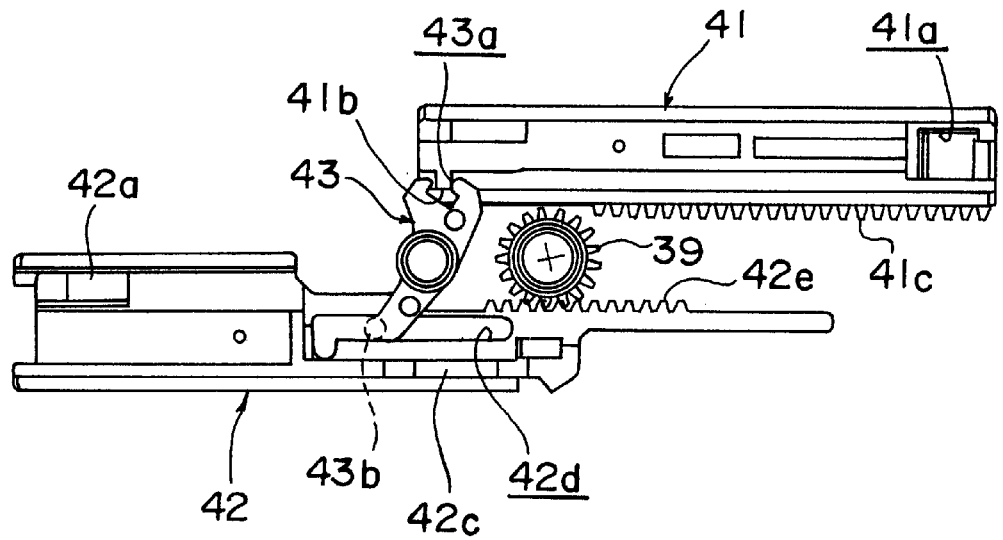
FIG. 16 is an explanatory plan view showing an operation state in which the main rack and the sub-rack operate in a disk cartridge reproducible position.

Then, the sub-rack 42 further moves in the direction J with the pivoting of the drive gear 39 and reaches the specified position (position corresponding to the recording and reproducing position of the cartridge 60) shown in FIG. 16.

By this operation, the engagement projection 11d of the holder 11 comes into engagement from above with the side cam portion 42a of the sub-rack 42 and slides along the side cam portion 42a, by which the cartridge 60 is loaded into the recording and reproducing position shown in FIG. 10.

Figure 17:
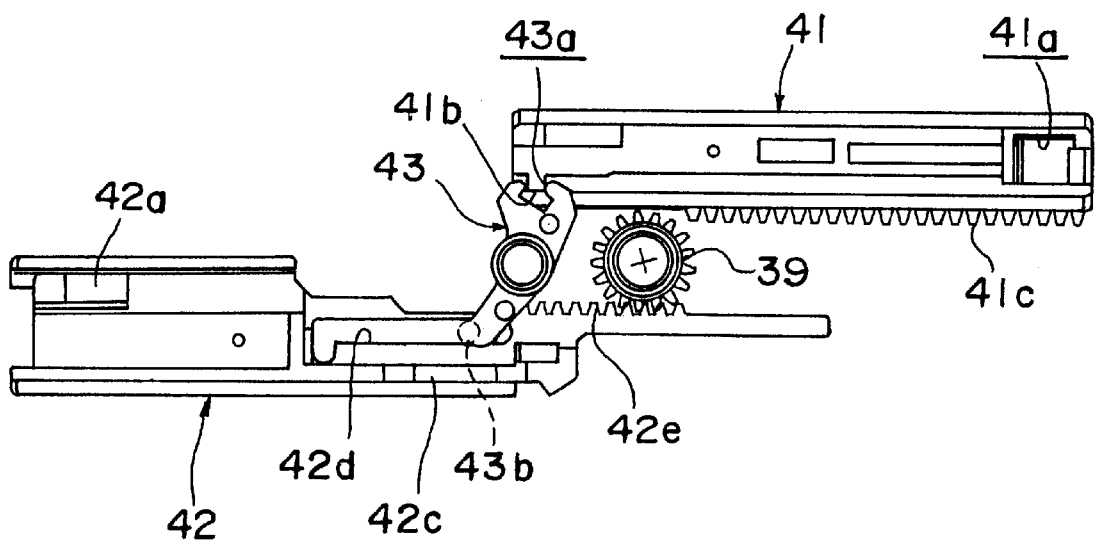
FIG. 17 is an explanatory plan view showing an operation state in which the main rack and the sub-rack operate in a disk cartridge recordable position.

When the sub-rack 42 further advances in the direction J, the head shifter 33 pivots downward since the arm 33b provided on one side surface of the head shifter 33 is engaged from above with an upper surface cam portion 42c of the sub-rack 42 (i.e., positioned on the upper surface cam portion 42c), by which the magnetic head 32a of the recording and reproducing unit 32 is made to pivot downward to be set into the recording enabled state (see FIG. 17).

As described above, according to the present embodiment, the main rack 41 provided with the recess 41a that serves as the first engagement portion to be engaged with the slider 12 and the sub-rack 42 provided with the side cam portion 42a that serves as the second engagement portion constituting part of the vertical movement mechanism are slidably arranged opposite to each other on the chassis 31, and the drive gear 39 is arranged between both these racks 41 and 42. The switch lever 43 for switching the state of meshing of the toothed portions 41c and 42e of the racks 41 and 42 with the drive gear 39 is provided while being able to engage with both the racks 41 and 42. One of the rack members is made to slide to a specified position by the rotation of the drive gear 39, and thereafter the switch lever 43 effects a switching operation so that the toothed portion of the other rack member meshes with the drive gear 39, by which the other rack member is made to slide to a specified position in a direction opposite to the direction in which the one rack member slides. Therefore, the two racks 41 and 42 that have different roles can be driven in the opposite directions by the one drive gear 39, and the switch lever 43 switches the state of meshing of this drive gear 39 with the toothed portions 41c and 42e of the racks 41 and 42, thereby allowing the racks 41 and 42 to be each driven with an appropriate timing.

With this arrangement, the structure can be simplified and decreased in size as compared with the case where the above two racks 41 and 42 are separately provided. Particularly, the disk drive can be decreased in size in the transfer direction of the disk cartridge 60.

Particularly when the disk cartridge 60 is loaded from the mounting and dismounting position to the recording and reproducing position, the main rack 41 is made to slide to a specified position corresponding to the insertion completed position of the disk cartridge 60, and thereafter the switch lever 43 effects a switching operation so that the sub-rack 42 is made to slide to a specified position corresponding to the recording and reproducing position of the disk cartridge 60. With this arrangement, the slide operation of both the racks 41 and 42 are switched in accordance with an appropriate timing, so that the transfer of the disk cartridge 60 from the mounting and dismounting position to the insertion completed position and the lowering operation from this insertion completed position to the recording and reproducing position can be performed as a loading operation sequence.

Furthermore, the sub-rack 42 is provided with the upper surface cam portion 42c that serves as the third engagement portion to engage with the head shifter 33 side of the magnetic head 32a of the recording and reproducing unit 32. The sub-rack 42 is made to slide to the specified position corresponding to the recording and reproducing position of the disk cartridge 60 and thereafter made to slide further in the same direction, consequently driving the head shifter 33 to set the magnetic head 32*a* into the recordable state. With this arrangement, a further role is assigned to the sub-rack 42, so that the size of the disk drive 1 can be further reduced.

It is to be noted that the present invention is not limited to the above embodiment, and various improvements or modifications in design can, of course, be achieved within the scope thereof, not departing from the essence thereof.

For example, in the above embodiment, with regard to the portions to be engaged with the transfer member (slider 12) and the drive mechanism (main rack 41), the slider 12 is provided with the engagement pin 12*b*, while the main rack 41 is provided with the recess 41*a*. However, the pin and recess may be replaced with each other. In the above embodiment, with regard to the cam mechanism constituting the vertical movement mechanism, the slider (engagement projection 11*d*) is provided on the holder 11 side, while the cam surface is provided on the drive mechanism (sub-rack 42) side. However, the slider and the cam surface may be replaced with each other. Furthermore, with regard to the cam mechanism provided between the head shifter 33 and the drive mechanism (sub-rack 42), the same modification can be achieved.

What is claimed is:

1. A disk drive comprising:

a chassis having a support portion;

a unit mounted on said chassis, said unit being operable to at least record information on, or reproduce information from, a medium encased in a disk cartridge;

a holder pivotally mounted on said support portion of said chassis, said holder being operable to hold the disk cartridge;

a transfer member mounted on said holder, said transfer member being operable to transfer the disk cartridge in a generally horizontal direction between a first position and a second position, said transfer member having a first engagement portion;

a vertical movement mechanism operable to move the disk cartridge in a generally vertical direction, between the second position and a third position, and a drive mechanism secured to said chassis, said drive mechanism being operable both to drive said transfer member to transfer the disk cartridge between the first position and the second position, and to drive said vertical movement mechanism to move the disk cartridge between the second position and the third position, said drive mechanism having a second engagement portion, wherein said first engagement portion of said transfer member is engaged with said second engagement portion of said drive mechanism.

2. A disk drive as claimed in claim 1, further comprising:

a first cam element on said chassis; and a second cam element not on said chassis, said second cam element being coupled with said first cam element;

wherein said coupled cam elements are operable to move said transfer member such that said transfer member transfers the disk cartridge between the first position and the second position.

3. A disk drive comprising:

a chassis having a support portion;

a unit mounted on said chassis, said unit operable to at least record information on, or reproduce information from, a medium encased in a disk cartridge;

a holder pivotally mounted on said support portion of said chassis, said holder operable to hold the disk cartridge;

a transfer member mounted on said holder, said transfer member operable to transfer the disk cartridge in a first direction between a mounting position and an inserted position, the first direction having a directional component that is parallel to said chassis, said transfer member having a first engagement portion, a movement mechanism operable to guide the disk cartridge in a second direction between the mounting position and the inserted position, the second direction having a directional component that is perpendicular to said chassis; and a drive mechanism mounted on said chassis, said drive mechanism operable to drive said transfer member from the mounting position to the inserted position relative to said chassis, said drive mechanism comprising a first rack member slidably arranged on said chassis, said first rack member including a second engagement portion engaged with said first engagement portion of said transfer member, said first rack member further including a first toothed portion, a second rack member slidably arranged on said chassis, said second rack member including a second toothed portion, a drive gear between said first rack member and said second rack member, said drive gear being meshed with one of said first toothed portion and said second toothed portion, and a switch lever operable to engage with said first rack member and said second rack member, said switch lever operable to switch between a state of meshing of said first toothed portion with said drive gear and a state of meshing of said second toothed portion with said drive gear.

4. A disk drive as claimed in claim 3, wherein said first rack member, said second rack member, said drive gear, and said switch lever are arranged such that rotation of said drive gear in a given direction slides one of said first rack member and said second rack member to a first specified position, such that after the rotation of said drive gear slides said one of said first rack member and said second rack member to the first specified position, said switch lever switches from a first state of meshing to a second state of meshing, said first state of meshing comprising one of the state of meshing of said first toothed portion with said drive gear and the state of meshing of second toothed portion with said drive gear, said second state of meshing comprising the other of the state of meshing of said second toothed portion with said drive gear and the state of meshing of said first toothed portion with said drive gear, and such that after said witch lever switches from the said first state of meshing to said second state of meshing, further rotation of said drive gear in said given direction slides the other one of said second rack member and said first rack member to a second specified position.

5. A disk drive as claimed in claim 4, wherein said first rack member, said second rack member, said drive gear, and said switch lever are arranged such that rotation of said drive gear in said given direction slides said first rack member to the first specified position, such that after the rotation of said drive gear slides said first rack member to the first specified position, said switch lever switches from said first state of meshing to said second state of meshing, said first state of meshing comprises a state of meshing of said first toothed portion with said drive gear, said second state of meshing comprises a state of meshing of said second toothed portion with said drive gear, and such that after said switch lever switches from said first state of meshing to said second state of meshing, further rotation of said drive gear in said given direction slides said second rack member to the second specified position.

6. A disk drive as claimed in claim 5, wherein said second rack member further includes a third engagement portion that engages a support member side of a magnetic head of said unit, and wherein said second rack member is operable to slide beyond the second specified position, thereby driving the magnetic head into a recording position.

7. The disk drive of claim 4, wherein said first and second rack members are slidably arranged opposite to each other, and wherein said drive gear is arranged between said first and second rack members.

8. The disk drive of claim 4, wherein said first and second rack members are operable to slide in opposite directions.

9. A disk drive comprising:

a recording and reproducing unit for recording information on a recording and/or reproducing medium encased in a disk cartridge and/or reproducing the information recorded on the medium;

a chassis having a support portion;

a holder for guiding and holding the disk cartridge, said holder being pivotally mounted on said support portion;

a transfer member for transferring the disk cartridge between a mounting and dismounting position where the disk cartridge can be mounted on and dismounted from said holder and an insertion completed position where the disk cartridge is completely inserted in said holder, said transfer member being mounted on said holder and having a first engagement portion;

a vertical movement mechanism for moving the disk cartridge in a generally vertical direction, between the insertion completed position and a recording and reproducing position where information can be recorded on the medium and/or reproduced from the medium by said recording and reproducing unit; and a drive mechanism operable both to drive said transfer member to transfer the disk cartridge to the insertion completed position, and to drive said vertical movement mechanism to move the disk cartridge in a generally vertical direction, between the insertion completed position and the recording and reproducing position, said drive mechanism being driven by a motor and having a second engagement portion, wherein said first engagement portion is engaged with said second engagement portion such that said first engagement portion is arranged to be disengageable from said second engagement portion by moving said first engagement portion in a vertical direction.

10. A disk drive as claimed in claim 9, wherein said drive mechanism is mounted on said chassis, and wherein said drive mechanism, said transfer member and said vertical movement mechanism are arranged such that said drive mechanism is operable to drive said transfer member and said vertical movement mechanism so that the transfer of the disk cartridge and the movement of the disk cartridge in the generally vertical direction are carried out in series.

11. A disk drive as claimed in claim 10, further comprising:

a rack member having a cam portion; and a third engagement portion formed on said holder, said third engagement portion engaging said cam portion, wherein said drive mechanism is operable to drive said rack member, wherein said drive mechanism is operable to drive said transfer member via engagement of said first engagement portion and said second engagement portion, to thereby transfer the disk cartridge between the mounting and dismounting position and the insertion completed position, and wherein said drive mechanism is operable to drive said vertical movement mechanism via engagement of said cam portion and said third engagement portion, to thereby move the disk cartridge in a generally vertical direction, between the insertion completed position and the recording and reproducing position.

12. A disk drive as claimed in claim 10, wherein said vertical movement mechanism includes a member that is movable in a direction parallel with said chassis, and that is movable with respect to said holder.

\* \* \* \* \*